United States Patent
Vollmer et al.

(10) Patent No.: US 7,643,415 B2
(45) Date of Patent: Jan. 5, 2010

(54) METHOD FOR CONTROLLING LINK CONNECTIONS IN A COMMUNICATION SYSTEM AND CORRESPONDING COMMUNICATION SYSTEM

(75) Inventors: Vasco Vollmer, Holle (DE); Matthias Hofmann, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 1116 days.

(21) Appl. No.: 10/450,870

(22) PCT Filed: Oct. 24, 2001

(86) PCT No.: PCT/DE01/04044

§ 371 (c)(1),
(2), (4) Date: Nov. 20, 2003

(87) PCT Pub. No.: WO02/51073

PCT Pub. Date: Jun. 27, 2002

(65) Prior Publication Data

US 2004/0081200 A1    Apr. 29, 2004

(30) Foreign Application Priority Data

Dec. 19, 2000    (DE) ................ 100 63 390

(51) Int. Cl.
*G01R 31/08*    (2006.01)
(52) U.S. Cl. .................................. 370/230.1
(58) Field of Classification Search ......... 370/225–228, 370/230–231, 395.2, 395.21, 395.42, 395.43, 370/412
See application file for complete search history.

(56) References Cited

U.S. PATENT DOCUMENTS

| | | | | |
|---|---|---|---|---|
| 5,687,167 | A * | 11/1997 | Bertin et al. | 370/254 |
| 6,141,322 | A * | 10/2000 | Poretsky | 370/231 |
| 6,580,688 | B1 * | 6/2003 | Klink | 370/220 |
| 6,771,648 | B1 * | 8/2004 | Kim et al. | 370/395.2 |
| 6,941,194 | B1 * | 9/2005 | Dauner et al. | 701/1 |
| 6,981,044 | B1 * | 12/2005 | Coez et al. | 709/226 |
| 7,154,851 | B1 * | 12/2006 | Fedyk et al. | 370/230 |
| 2002/0041592 | A1 * | 4/2002 | Van Der Zee et al. | 370/389 |
| 2003/0133411 | A1 * | 7/2003 | Ise et al. | 370/230 |

FOREIGN PATENT DOCUMENTS

| | | |
|---|---|---|
| DE | 198 53 665 | 5/2000 |
| DE | 100 40 012.4 | 2/2002 |
| EP | 03 91 792 | 10/1990 |
| EP | 097 15 09 | 1/2000 |

(Continued)

OTHER PUBLICATIONS

"The HAVi Specification: Specification of the Home Audio/Video Interoperability (HAVi) Architecture," HAVI Specification, Nov. 19, 1998.

*Primary Examiner*—Kwang B Yao
*Assistant Examiner*—Tung Q Tran
(74) *Attorney, Agent, or Firm*—Kenyon & Kenyon LLP

(57) ABSTRACT

To control links in a communication system, a message having information about the transmission format is transmitted in response to a link request. After the determination of whether sufficient transmission capacity is available for this transmission format, link data and priority attributes are used to check if an existing link can be stopped in favor of the desired link.

10 Claims, 1 Drawing Sheet

FOREIGN PATENT DOCUMENTS

| | | | |
|---|---|---|---|
| FR | 277 95 95 | | 12/1999 |
| GB | 2344029 | * | 5/2000 |
| JP | 63226151 | | 9/1988 |
| JP | 6188899 | | 7/1994 |
| JP | 9046367 | | 2/1997 |
| JP | 11041291 | | 2/1999 |
| JP | 2000115198 | | 4/2000 |
| JP | 2000196607 | | 7/2000 |
| JP | 2000253463 | | 9/2000 |
| WO | 98 51 060 | | 11/1998 |

* cited by examiner

METHOD FOR CONTROLLING LINK CONNECTIONS IN A COMMUNICATION SYSTEM AND CORRESPONDING COMMUNICATION SYSTEM

FIELD OF THE INVENTION

The present invention starts out from a method for controlling connections in a communication system.

BACKGROUND INFORMATION

A serial bus system, in which various terminals (nodes) are linked by either a cable having 4-6 conductors or an optical fiber, is described in IEEE Standard 1394. In this context, at least one node can be designed to be able to assume additional data-management functions for the network (bus management).

In addition to the above-mentioned standard, there is a bus-independent extension which is referred to by the name HAVi (Home Audio Video interoperability). This HAVi specification ("The HAVi Specification 1.0") describes, in particular, the remote control of devices, using a resource manager which seizes a resource on demand and releases it again.

The HAVi standard provides that a request for transmission capacity which cannot be satisfied due to the current bus loading is rejected.

SUMMARY OF THE INVENTION

Important information may be transmitted when other data transmissions do not allow the communication system to provide the bandwidth necessary for the new link to the important information.

One or more existing, active links are inactivated when the priority attribute assigned to them has a lower significance than that of the desired link.

When a link is desired, a message is sent which contains information about the transmission format of the desired link, such as bandwidth and type of link. The following then occurs:
  it is determined if sufficient transmission capacity is available for this transmission format;
  if not, link data and priority attributes are used to check if at least one link is present, which is assigned a lower priority attribute than the desired link;
  in the latter case, the transmission of data is stopped for those links having a lower priority attribute, and the desired link is established.

A communication system according to the present invention may be, in particular, a bus system for exchanging data between resources of a motor vehicle, having system elements that can set up communication links via the bus system, and having a master system element that is equipped for the following system functions:
  to check if sufficient transmission capacity is available in the bus system;
  to collect link data and priority attributes of system elements;
  to evaluate link data and priority attributes of the system elements to determine if a desired transmission-format link having a predefined priority attribute can be set up at the cost of active links iii the communication system having a lower priority attribute.

It is particularly advantageous not to end links having a lower priority attribute, but rather to temporarily stop the data transmission belonging to them, until the link having the higher priority attribute has ended. These measures allow the interrupted link to be continued without delay, and the establishment of a link does not have to be re-initiated.

According to another implementation, data accumulating in the meantime may be temporarily stored and only transmitted after the enabling of the link having the lower priority attribute. With the aid of this measure, no loss of data occurs during the time in which the link having the higher priority attribute takes precedence.

It may also be advantageous to assign priority attributes to the software elements of the communication system themselves. When these priority attributes assigned to the software elements are also allocated to the links with regard to at least their priority rank, the advantages shown in published German Patent Application No. 100 40 012.4, such as the reduction in frequent manual inputs, can additionally be utilized.

The storage of the priority attributes of the software elements and/or links together with the link data allows a rapid evaluation and decision in favor of links having a high priority attribute.

An embodiment of the communication system according to the present invention, in that the master software element is set up to temporarily stop the data transmission of active links having a lower priority attribute, until a link having a higher priority attribute is ended.

DETAILED DESCRIPTION

The present invention may be explained better with reference to the serial bus system according to the IEEE Standard 1394, and also with reference to the extension according to the HAVi specification. To provide a better understanding, IEEE Standard 1394 and the HAVi specification will be discussed prior to the actual explanation of the present invention.

Figure 1:
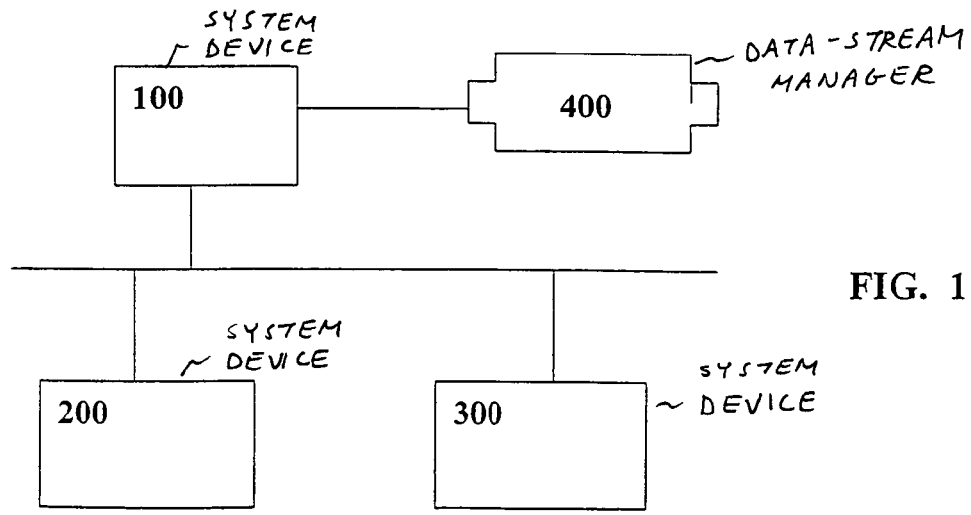
FIG. 1 shows an exemplary network topology of a communication system according to the present invention.

According to FIG. 1, the different terminals (nodes) are linked by either a cable having 4-6 conductors or an optical fiber waveguide 1. In this context, a node may optionally be constructed as an terminal (leaf) 400 or a relay node (branch) 200, 300. The top node is referred to as root 100. The use of different node types allows a suitable network topology to be set up. In this context, a leaf receives information packets and processes them when the target address of the packet matches its own. A branch must additionally transmit all the packets that it receives on a port to all of the other ports.

IEEE 1394 provides for the network being self-configuring, i.e. after being switched on or after a reset, all of the nodes transmit some selected information items about themselves to the network. In this context, this information is received by all of the nodes. One node can be designed here to be able to assume additional data-management functions for the network (bus management). To this end, it collects all of the information of the other nodes, processes it, and internally stores it in a suitable manner. If several nodes have bus-management capabilities, there is a competitive process from which one node emerges as the victor and then assumes the bus management.

In addition to the process as described in the specifications for IEEE 1394, there is the bus-independent extension, HAVi, which is suitable for use in an IEEE 1394 network. In particular, the remote control of devices from any other point in the network is described in the HAVi specification. To this end, a distributed model is described in which the devices are controlled by control modules, so-called device control modules (DCM). These DCM's run as a software element on the device which executes the control functions on another device. In this context, each DCM is specific to a particular device or a device class. Representing a further group of software elements are the functional component modules, of which several can be hierarchically arranged underneath each DCM, and of which each is responsible for the control of a specific functional part of a device.

An important requirement for such a system is to continually process colliding instances of access to a device, i.e. the processing of two or more simultaneous requests to seize one device. In this context, one can differentiate between devices that allow more than one instance of access, e.g. DAB tuners, and those that each allow only one instance of access, e.g. loudspeakers. The HAVi standard provides one or more resource managers 400, which seize a resource (device) 100, 200, 300 on demand and release it again. In the terminology of HAVi, there are so-called contenders, which designation is given to software elements, and which request access to one or more resources. In addition, there are clients, which are software elements presently accessing a resource. Therefore, a contender becomes a client after a successful request.

A client obtains the authorization to use a resource by reserving it. However, additional data-transmission capacity on the bus is generally needed for this purpose. This bus capacity is managed by so-called stream managers. A stream manager is, in particular, a master software element, which sets up a channel having the requested transmission rate and the requested link characteristics from a source to a target, in response to the request of another software element. If a sufficient amount of free transmission rate is not available to fulfill the new request, the inquiry is denied in the context of the HAVi specification.

The terms used in the following are briefly explained here to obtain a better understanding:

software element (SE): each software component in an HAVi system, i.e. all of the system components, applications, and drivers are designated as software elements.

registry (memory): the registry contains information on each software element available in the network and each available device. In this context, information about the individual software elements is stored in attributes. In addition to the predefined attributes, it is possible to add further ones. The architecture of the registry is a distributed system, i.e. each device may include a part of the entire registry, but it may also be supported centrally. This is inconsequential for access to the registry, since, if the occasion arises, the different entities of the registry independently exchange the required information inside the network.

stream manager (SM): the stream manager is used to set up, disconnect, and manage links between software elements and/or devices. The stream manager may be set up as a distributed system, as is the registry. In this context, special commands are used to obtain the state of all the stream managers or a particular stream manager.

software-element identifier (SEID): the software-element identifier is used as the unique identifier of a software element. A specific software element is addressed with the aid of the software-element identifier. The software-element identifier may have a length of 80 bits and include the unique device identifier (GUID, 64 bits) and a so-called software handle (16 bits), by which a software element is identified inside a device.

functional control module (FCM): a functional control module is a software element by which a functional unit of a device, e.g. a CD-ROM drive or an FM tuner is controlled.

The method of the present invention concerns a network or communication system for use in vehicles. A important capability for a vehicle is the continual and predictable treatment of high-priority requests for resources (devices and data transmission). The existing HAVi standard provides that a demand, which cannot be satisfied due to the current or planned bus loading, is rejected. Since important status messages, such as error warnings or driving instructions, must be transmitted in the vehicle, the use of a priority-based link management is advantageous. To this end, the method according to the present invention prioritizes instances of access to devices for the prioritization of links. In this context, a link may receive the same priority assigned to the initiating software element.

The priority associated with a software element, e.g. an application or an FCM, is stored in an attribute in the registry, and there, it may be read out to the registry with the aid of a request (Registry:: GetELEMENT). The attributes entered into the registry have the format ATT_XXXX, where XXXX stands for a meaningful name of the attribute. In the sequence, the designation ATT_Priority is used for the priority attribute, but a different designation that follows the fundamental format may also be used. Each attribute is assigned a value from a 32-bit range. In the HAVi standard, this range is split up in such a manner, that the range hex0000 0000 to hex7fff fff is reserved for system attributes, while the rest of the range (hex8000 0000 to hexffff ffff) is used for priority expansion. Since the attribute for the priority is not defined as a system attribute in the HAVi standard, a value from the upper range should be used for this, e.g. hex8000 0000.

The function requests, Registry::GetELEMENT and Registry::Multiple GetELEMENT, are used to search for software elements having a particular attribute. In this context, one may search for one or more attribute descriptors, e.g. ATT_Priority and the value entered under this descriptor. Each function then gives a list of the SEID's of the software elements, to which the transferred search criteria apply. When the SEID of a software element is instead known, the set of attributes stored for it may be retrieved by the call, Registry::RetrieveElement.

Figure 2:
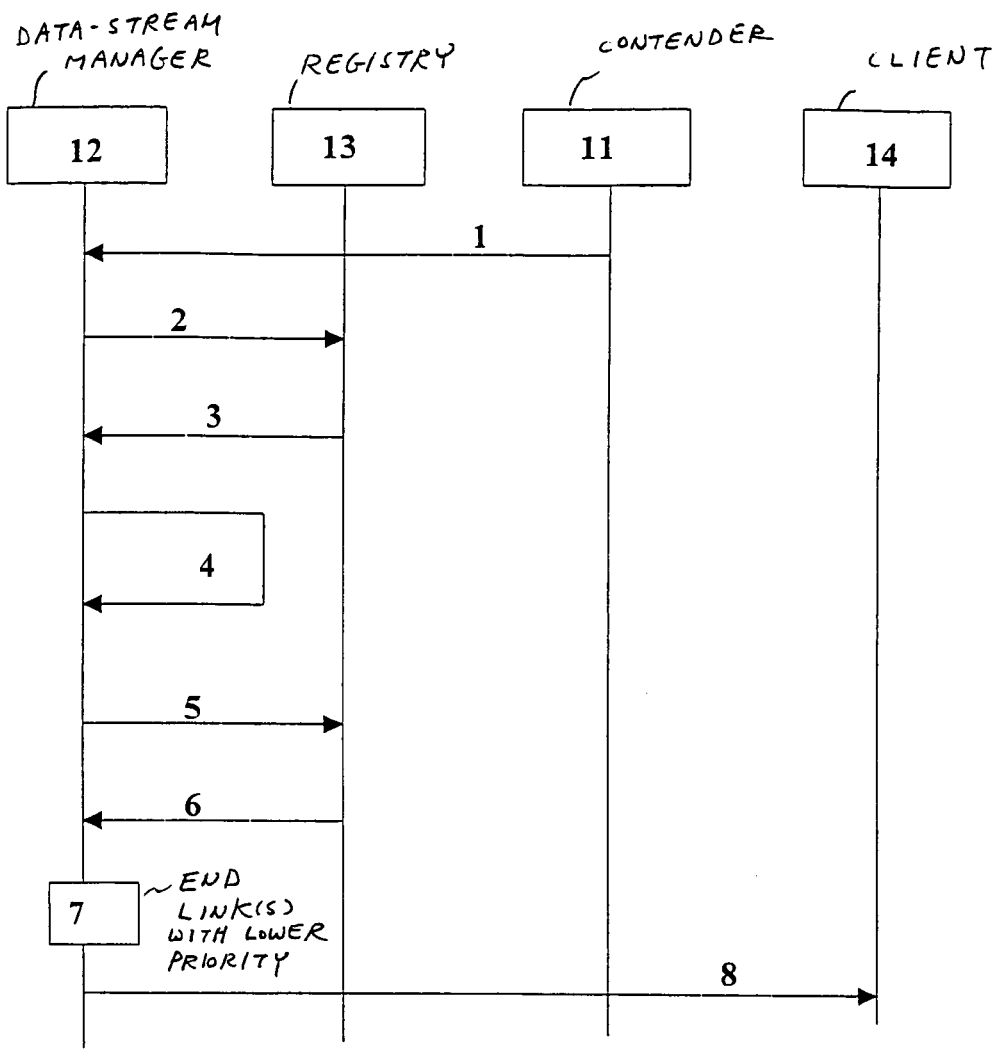
FIG. 2 shows an exemplary sequence of the priority-based link management according to the present invention.

The method of the present invention illustrated in FIG. 2 starts out from a contender 11 which requests its link to a device or another software element. To this end, it transmits call 1, Streammanager::FlowTo, to data-stream manager (stream manager) 12. This call includes the source and sink and a pattern, which contain some information about the transmission format, such as bandwidth and link types. With the aid of this information, stream manager 12 determines if the bus system is able to carry the requested data stream, i.e. if enough bandwidth of the requested type is available. If this is the case, the corresponding link is set up and a link identifier is given back to the software element calling. If a sufficient amount of bandwidth is not available to satisfy the request, then the HAVi standard provides for the request being denied. However, a stream manager 12 working according to the method of the present invention makes an inquiry, RetrieveElement 2, to registry 13, in order to determine the value of attribute ATT_Priority of the software element that is calling. This inquiry 2 is answered by registry 13 with answer 3. Stream manager 12 then collects information regarding all or selected links active in the network (function: Streammanager::Get Global Connection Map) 4. The stream manager selects one, several, or all of the software elements having active links and extracts (inquiry 5) the corresponding priority for these software elements (clients) 14 in registry 13 ((Registry:: RetrieveElement). This inquiry is answered, using reply 6 from clients 14. With the aid of the link data and the priorities of the software elements (clients) 14, stream manager 12 selects the ones that have a lower priority and appropriate links with regard to the type of link and the transmission rate. The links ascertained in this manner are then ended (7), and affected clients 14 are informed that their data transmission is being stopped (8), in order to make the corresponding bandwidth available for the higher-priority link.

The following examples, which are explained with reference to the topology of the communication system illustrated in FIG. 2, clarify this sequence of the method. In this context, 100, 200, and 300 designate devices in the communication system, and 400 designates a stream manager. Devices 200 and 300 maintain a low-priority link, which is set up by device 300 and seizes the entire link capacity of the network. With the help of stream manager 400, device 100 attempts to set up a link to device 200. Stream manager 400 determines the available bandwidth (none). The inquiry of the priority of device 100 in registry 13 yields the relatively high value of 3. In addition, stream manager 400 compiles a list of the active links. The initiator of the active link can be recognized from this list (device 300). The inquiry about the priority of device 300 yields the lower priority 5. Stream manager 400 then decides to end the link between device 300 and device 200. For this purpose, it transmits a message in which the termination of the link is reported. Afterwards, all of the resources associated with this link are immediately available again, and stream manager 400 signals to device 100 that a link has been successfully set up and transmits a link-identity number.

In a further example, both devices 200 and 300 and stream manager 400 are able to park a link this time, i.e. to interrupt it temporarily and continue it later. In this manner, the higher-priority request of device 100 does not result in the termination of the link of device 300 to device 200, but rather stream manager 400 informs the participants that the link is being parked. After the resources are freed by device 100, stream manager 400 informs devices 200 and 300 that the link may be activated again. The data accumulated during the parking may be temporarily stored, in order to first transmit it after the ending of the link having a higher priority attribute.

To implement, in particular, the method according to the present invention, system elements 100, 200, 300; 11, 13, 14 are provided with an arrangement for setting up communication links via the bus system. A master system element (data-stream manager or stream manager) 12 or 400 is equipped for the following system functions:

- to check if sufficient transmission capacity is available in the bus system;
- to collect link data and priority attributes of system elements;
- to evaluate link data and priority attributes of system elements 100, 200, 300 or 11, 13, 14 to determine if a desired link of a transmission format having a predefined priority attribute can be established at the cost of active links in the communication system having a lower priority attribute.

In a further embodiment, master system element 12, 400 may be equipped to temporarily stop the data transmission of active links having a lower priority attribute, until a link having a higher priority attribute is ended.

What is claimed is:

1. A method for controlling links in a communication system, comprising:
    sending, by an element in the communication system to a data-stream manager, a message including information about a transmission format of a desired link, the information including at least one of bandwidth and a link type;
    determining, by the data-stream manager, whether sufficient transmission capacity is available for the transmission format of the desired link;
    if it is determined by the data-stream manager that there is not sufficient transmission capacity for the transmission format of the desired link, checking by the data-stream manager, using link data and priority attributes, whether at least one link is present which is assigned a lower priority attribute than the desired link;
    if at least one link is present which is assigned a lower priority attribute than the desired link, temporarily stopping transmission of data for the at least one link assigned a lower priority; and
    setting up the desired link;
    wherein data transmission on the at least one link assigned a lower priority is stopped until the desired link is ended.

2. The method of claim 1, further comprising:
    continuing data transmission on the at least one link assigned a lower priority after the desired link is ended.

3. The method of claim 2, further comprising:
    temporarily storing data accumulating between the stopping and the continuation of data transmission on the at least one link; and
    transmitting the stored data when data transmission is continued.

4. The method of claim 1, wherein the communication system includes software elements for controlling devices, the software elements being assigned priority attributes.

5. The method of claim 4, wherein the priority attributes assigned to the software elements are also assigned to the at least one link and the desired link.

6. The method of claim 5, wherein the priority attributes of at least one of the software elements, the at least one link and the desired link are stored together with the link data.

7. The method of claim 6, wherein the data-stream manager is configured to direct an inquiry to a memory storing the priority attributes of at least one of the software elements, the at least one link, the desired link, and the link data, to determine a value of the priority attribute of the software element initiating a link request, the data-stream manager further collecting information about at least some of active links in the communication system and extracting their priority attributes from the memory.

8. The method of claim 7, wherein the data-stream manager stops at least one link having a priority attribute lower than a priority attribute of the software element initiating a link request, using the priority attributes for the active links in the communication system and the priority attribute of the software element initiating the link request.

9. A communication system for the exchange of data between components of a motor vehicle, comprising:
    at least one system element including an arrangement for establishing communication links via a bus system, wherein the at least one system element is configure to send a message including information about a transmission format of a desired link, the information including at least one of bandwidth and a link type; and
    a master system element configured as a data-stream manager and configured to:

receive the message from the at least one system element, check whether sufficient transmission capacity is available for the transmission format of the desired link in the bus system, collect link data and priority attributes of the at least one system element, evaluate link data and priority attributes of the at least one system element to determine whether a desired link having a transmission format of a predefined priority attribute may be established at the expense of an active link in the communication system having a lower priority attribute, and if at least one active link is present which is assigned a lower priority attribute than the desired link, temporarily stopping transmission of data for the at least one link assigned a lower priority attribute.

10. The communication system of claim 9, wherein the master system element is configured to temporarily stop data transmission of the active link having a lower priority attribute until the desired link is ended, and subsequently resume data transmission of the link having the lower priority after the desired link is ended.

* * * * *

UNITED STATES PATENT AND TRADEMARK OFFICE
CERTIFICATE OF CORRECTION

PATENT NO.       : 7,643,415 B2                                                Page 1 of 1
APPLICATION NO.  : 10/450870
DATED            : January 5, 2010
INVENTOR(S)      : Vollmer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1631 days.

Signed and Sealed this

Sixteenth Day of November, 2010

David J. Kappos
*Director of the United States Patent and Trademark Office*